United States Patent [19]

Markin et al.

[11] Patent Number: 4,740,435

[45] Date of Patent: Apr. 26, 1988

[54] CELL SEALANT

[75] Inventors: Charles Markin; Ronald J. Book, both of Toronto; Dennis A. James, Mississauga, all of Canada

[73] Assignee: Duracell Inc., Bethel, Conn.

[21] Appl. No.: 798,502

[22] Filed: Nov. 15, 1985

[51] Int. Cl.⁴ .............................................. H01M 2/08
[52] U.S. Cl. .................................... 429/174; 429/185; 429/173
[58] Field of Search ................ 429/174, 185, 171, 173

[56] References Cited

U.S. PATENT DOCUMENTS

| | | | |
|---|---|---|---|
| 4,224,736 | 9/1980 | Feldhake | 429/174 X |
| 4,248,944 | 2/1981 | Smilanich | 429/185 |
| 4,263,380 | 4/1981 | Riedl | 429/174 |
| 4,282,293 | 8/1981 | van Lier | 429/185 |
| 4,384,030 | 5/1983 | LeDuc et al. | 429/174 |
| 4,521,500 | 6/1985 | Watanabe | 429/174 |

FOREIGN PATENT DOCUMENTS

| | | | |
|---|---|---|---|
| 0061637 | 5/1979 | Japan | 429/185 |
| 0016344 | 2/1986 | Japan | 429/185 |

Primary Examiner—Anthony Skapars
Attorney, Agent, or Firm—Ronald S. Cornell

[57] ABSTRACT

Leakage resistance in electrochemical cells is improved by the utilization of an elastomeric modified asphalt sealant material disposed between an insulative cell top and the cell container.

7 Claims, 1 Drawing Sheet

U.S. Patent          Apr. 26, 1988          4,740,435
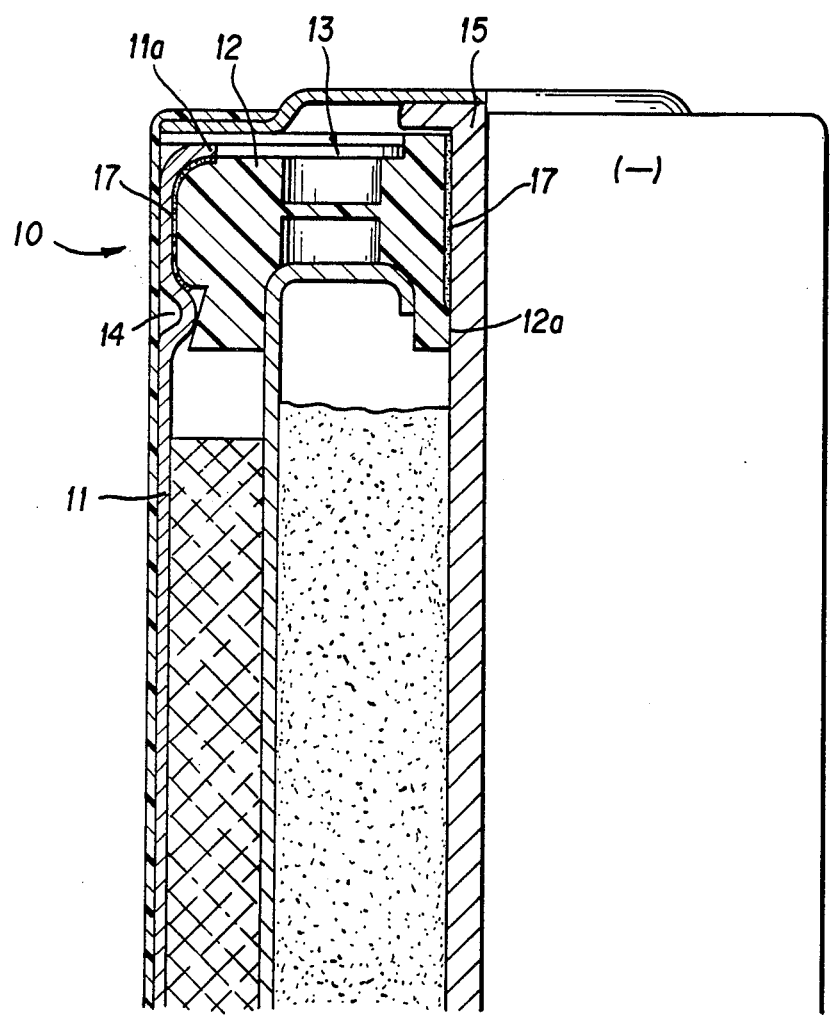

4,740,435

CELL SEALANT

This invention relates to sealants for electrochemical cells and particularly to asphalt sealants for alkaline cells.

Aqueous electrolyte cells are generally constructed with seals of the type known as "crimp seals" wherein the upper end of an open cell container is crimped over a supported insulative rubber or more commonly plastic grommet or cell top member to seal the cell against electrolyte leakage. However, a crimp of this type is generally susceptible to electrolyte leakage resulting from cold flow of the plastic on temperature cycling or imperfections and non uniform contours between the grommet or cell top and the crimped over container end. Accordingly it is a common practice to utilize a sealant in conjunction with the crimp seal. Such sealants include asphalt, asphalt with ethylene-vinyl acetate copolymers, fatty polyamides, epoxy-polyamide resins and the like. These sealants are generally in solid form and accordingly it is an important requirement that they be capable of being liquefied such as by being soluble to an appreciable extent in a volatile solvent carrier such as toluene. The sealant, in liquified form, is dispensed within the region desired to be sealed, generally the interface between the cell container and the cell top member, thereafter the solvent carrier is volatilized and removed and the cell is sealed. Alternatively, the cell top or sealing grommet is coated with the sealant with the solvent being similarly driven off. The sealant materials are of varying degrees of effectiveness and are generally utilized with tradeoffs in material handling, cost, resistance to alkaline such as KOH electrolyte, temperature sensitivity and the like.

It is an object of the present invention to provide a novel economical sealant material which is highly effective and is easily compounded and handled.

This and other objects, features and advantages of the present invention will become more evident from the following discussion and the drawing in which:

The sole FIGURE is a partial sectioned view of the sealing area of an electrochemical cell depicting the application of the sealant of the present invention.

Generally the present invention comprises an electrochemical cell with improved leakage characteristics comprising an anode, a cathode and an electrolyte disposed within an open ended cylindrical metallic cell container, with an insulative cell top member being positioned within said open end and an elastomeric modified asphalt sealant at the interface between the cell top member and the metallic cell container. Asphalt is generally defined as being a highly viscous mixture of paraffinic, naphthenic and aromatic hydrocarbons together with heterocyclic compounds containing sulfur, nitrogen and oxygen as well as small amounts of metals (The Encyclopedia of Chemistry, 2nd Ed. Van Nostrand Reinhold). Asphalt's primary properties are its adhesive quality, waterproofing ability, and general chemical inertness. Because of such properties it is widely utilized as a sealant in electrochemical cells. Two major types of asphalt are the viscous Newtonian fluid type generally utilized for road paving (a relatively soft asphalt) and the harder non-Newtonian type having a definite yield stress commonly utilized in producing roofing and floor-covering materials. The latter asphalt, also known as Type 2 BUR (built up roofing), is more suitable for use in sealing electrochemical cells because it forms a hard substantially impermeable barrier to the cell electrolyte. However, since it is relatively rigid there is a tendency for microcracks to form particularly after cycling to low temperatures. Additionally, it tends, on occasion, to be detrimentally subject to cold flow due to loss of ductility on temperature cycling, with possible resultant electrolyte leakage. In accordance with the present invention, asphalt and particularly the Type 2 BUR asphalt is modified by the addition of an elastomeric material in amounts sufficient to provide it with elastic properties whereby it can successfully withstand such detrimental cold flow while still retaining its desirable characteristics, particularly its highly adhesive character. The elastomeric material is added to the asphalt in amounts ranging between about 0.5% to about 10% by weight and preferably between 1% to 2% wherein the asphalt becomes sufficiently elastic without substantially losing its adhesiveness and the elastomer remains substantially homogeneously dispersed within the asphalt. Examples of elastomeric materials include both natural and synthetic rubbers including natural rubber (cis-1,4-polyisoprene), styrene-butadiene copolymer (SBR) and other butadiene derivatives such as cis-1,4-polybutadiene and styrene butadiene styrene (SBS), styrene isoprene styrene (SIS), neoprene (polychloroprene), acrylonitrile-butadiene copolymer (NBR), ethylene-propylene elastomers (EPR), butyl rubber (copolymers of isobutylene), urethane, nitrile (polymers of butadiene and acrylonitrile), polysulfide, polyacrylate, silicone, chlorosulfonated polyethylene, EPDM (terpolymers of ethylene, propylene and diene monomers) and the like as well as mixtures thereof. Selection of a suitable elastomeric material is dependent upon various factors including cost and compatibility with cell components particularly the cell electroltye. The asphalt is preferably modified with the elastomeric material by mixture within a common solvent and then removal of the solvent such as by evaporation. Solvation of the asphalt and the elastomer within a single readily obtainable solvent is another consideration in the selection of an elastomer. Alternatively, both the asphalt and the elastomer may be melted together, with the asphalt functioning as a solvent for the elastomer at the higher temperatures, and thereafter applied as a hot melt material. Preferably the elastomer and asphalt mixture is applied to the required sealant location as an easily applied liquid prior to solvent removal or hot melt solidification thereby forming the elastomer modified asphalt sealant in situ. Preferred solvents include highly aromatic solvents such as white spirits (kerosene), toluene and xylene because of their ready solvation of both asphalt and elastomeric materials and their high volatility whereby they can be readily driven off. The amount of solvent utilized in the formation of the elastomer-asphalt mixture should be sufficient to solvate elastomer and asphalt but not in too much excess whereby it is not readily removable. Alternatively, if possible with the specific materials being utilized and the manufacturing procedure being followed, a solvent carrier is not utilized with the elastomeric modified asphalt being applied, as required, in the form of a hot melt liquid.

A commonly utilized asphalt material for sealing of electrochemical cells is a Type 2 BUR available from Gulf Corp. as its Gulf 2 asphalt. Such material is soluble in solvents such as toluene and can be modified with an elastomer such as SBR or chloroprene, the latter being preferred because of its significantly higher resistance to KOH, the commonly utilized alkaline cell electrolyte. In addition elastomeric asphalts of various types are commercially available from companies such as Uniroyal Corp. (e.g. Uniroyal 6125), Tosco Corp. (e.g. Lion Nokorade 705M), Shell Corp. (e.g. Cariphalte F.R., a rubberized asphalt suitable for hot melt application), and Tremco Corp. Preferably, the elastomeric asphalt should not gel on standing since dispensing of the material on a production basis becomes difficult and homogeneity might be affected. Gelling is however a characteristic of the Type 2 BUR asphalt which contains large proportions of the high molecular weight asphaltene which is only partially soluble in the aforementioned solvents. Addition of the elastomer provides a competing solvation reaction with resultant precipitation of the asphaltene on standing. Accordingly, it is preferred that the percentage of elastomer addition be controlled and should not generally exceed 2% by weight of the asphalt. An increase in the amount of solvent is however not useful in preventing such precipitation since the asphalt concentration is diluted thereby with a thinner than required layer being deposited. Furthermore, increased solvent amount increases costs and complicates manufacture since more time is required to remove the solvent upon deposition. Thus, limiting elastomer addition is preferred or alternatively, or in addition, various stabilizing additives may be included in the asphalt to maintain the elastomeric asphalt in the easily dispensed liquid form. Oil extenders may be used in this regard to maintain a low viscosity. If however, the elastomeric modified asphalt is suitable for use as a hot melt material the amount of added elastomer may be increased to about 10%. Further inclusions may affect the adhesive properties of the asphalt (elastomers tend to have low adherent properties) and such further inclusions are generally uneconomical.

The elastomeric material acts as a binder material for the asphalt particles, once the solvent carrier such as toluene has been driven off (or if applied as a hot melt when the liquid has solidified), thereby providing a more continuous film with fewer microcracks in the seal area than regular asphalt. The elastomeric material binder also allows the film to be more resilient during crimping operations, thereby resulting in desirable "flow-out" of the sealant along the contours of the seal area for greater uniformity and enhanced sealing. In addition, the elastomer modified asphalt remains ductile at low temperatures and the sealant film at the seal area of the cell stays intact under shock and vibration conditions. The elasticized asphalt should be substantially inert to the cell components and particularly to the electrolytes such as hydroxides (KOH and NaOH) commonly utilized in alkaline cells. Furthermore, the concentration of the elastomeric asphalt material in the solvent carrier should be sufficiently high such that a deposited sealant film should have a thickness of at least 1 mil (0.025 mm).

A particularly useful rubberized asphalt material suitable for use in accordance with the present invention is comprised of chloroprene (neoprene) modified Gulf 2 asphalt in a toluene carrier. The neoprene elastomer is highly resistant to KOH as well as other corrosive substances and is soluble in toluene. The toluene solvent is easily volatilized and is preferred from a manufacturing standpoint.

Another preferred sealant material is a styrene based rubberized asphalt in a toluene carrier from Tremco Corp. which in addition to its resistance to alkaline electrolyte also exhibits minimal fluid separation upon long term storage and handling thereby rendering it particularly useful for manufacturing purposes.

The elastomeric modified asphalt is applied to an area of the cell at the interface of an insulative polymeric or plastic cell top or grommet and a metal cell sealing member. Such areas include the interface between the cell top and the cell container in the crimp seal area (either placed on the outer periphery of the cell top or the inner wall surface of the cell container), and the portion of the cell top through which a metallic terminal conductor is placed. The sealant of the present invention is applied to the cell top and/or the cell container as a liquid with a residual layer of at least 1 mil (0.025 mm) being formed to cover and seal the interface area. The portion of the cell top through which a metal conductor such as a nail extends is filled with the sealant prior to nail insertion such that the nail will be sealed thereto within the cell top. In button type cells wherein a grommet is disposed between a metal cell top and a metal cell container the sealant may be applied to the area of either or both interfaces as desired. The liquid is allowed to dry (such as by volatilization of the solvent) with the formation of an adherent elastomeric asphalt film being formed. The cell top and container are brought together with the sealant therebetween and the cell is sealed. Similarly the nail is inserted in the cell top with the sealant between the nail and the walls of the aperture in the cell top.

In the drawing, a cell 10 is shown with an open ended cylindrical container 11 having a plastic cell top 12 closing the open end 13 of container 11. The cell top is seated on bead 14 formed in the cell container 11 near its open end 13. The end of container 11 is crimped over to effect a seal with cell top 12. Nail conductor 15 is inserted into aperture 12a of the cell top for electrical contact with the cell anode. Elastomeric asphalt sealant material 17 is disposed at the peripheral end of container 11 and the cell top 12 at their interface between the lip 11a of the cell container and the bead 14. Additionally, such sealant material 17 is also disposed at the interface between nail conductor 15 and the walls of aperture 12a in cell top 12. Leakage of electrolyte from the cell is thereby substantially minimized.

In order to more clearly demonstrate the efficacy of the present invention the following examples are presented. It is understood that such examples are illustrative in nature and are not to be construed as a limitation on the present invention. Unless otherwise indicated all parts are parts by weight.

EXAMPLE 1

Twelve alkaline cells of AA size are constructed with each having a zinc anode, manganese dioxide cathode and an aqueous KOH electrolyte (about 1.2 grams of a 37% KOH solution). The cell components are contained within a metallic cylindrical container which is closed with a polypropylene cell top seated on a bead formed in the cell container adjacent the open end thereof. A nail type current collector is inserted within a central aperture in the cell top for electrical contact with the cell anode. The end of the cell container is crimped over the periphery of the cell top to close the cell. Prior to placement of the cell top 0.05 gms of a sealant material comprised of 4% SBR rubber, 56% Gulf 2 asphalt in a 40% toluene solvent carrier (Brookfield viscosity of 5,000 cps) is dispensed on the inner peripheral surface area of the cell container between the cell container lip and the bead to cover the interface between cell top and container end (0.05 gm with toluene carrier). The sealant material is also placed within the central aperture whereby, upon insertion of the nail, it forms a seal between the nail and the walls of the cell top aperture. The solvent is allowed to volatilize with a residual layer of SBR-asphalt in excess of 1 mil (0.025 mm) being formed at the interface area. The cell container end is then crimped over the cell top to complete the seal. The cells are subjected to 5 TCHT (temperature cycling with humidity test—each cycle ranging between −30° C. to 71° C. for 3-4 days with a humidity range of between 25% to 90%) cycles. None of the cells show any evidence of leakage.

EXAMPLE 2

Groups of cells made in accordance with Example 1 but with a sealant material comprised of 1% DuPont Neoprene AD (trademark for chloroprene), 33% toluene and 66% Gulf 2 asphalt (a sealant with a viscosity of 2500 cps.) are subjected to various abuse conditions with results given in the following table. As a control a sealant comprised of 75% Gulf 2 asphalt and 25% toluene (viscosity 4200 cps.) is similarly utilized in groups of cells subjected to the same abuse regime with the testing results given in Table I.

TABLE I

| CELL GROUP | ABUSE CONDITION | NEOPRENE MODIFIED ASPHALT | ASPHALT (control) |
|---|---|---|---|
| | | (leaking cells/total cells) | |
| 1 | 55° C. for 2 Weeks | 0/25 | 0/30 |
| 2 | TCHT/2C | 0/30 | 0/30 |
| | TCHT/2 | 2/30 | 4/30 |
| 3 | 71° C. for 1 week | 0/30 | 0/30 |
| | 71° C. for 3 weeks | 0/30 | 6/30 |
| 4 | Partial discharge (1 HR. at 3.9 ohm) | | |
| | then 71° C. for 1 week | | 0/12 |
| | then 21° C. for 1 week | | 0/12 |
| 5 | Shock and Vibration (6' drop and 60 Hz vibration for ½ hr.) | | |
| | then −40° C. for 3 days | | |
| | then 21° C. for 1 week | 0/12 | 0/12 |
| 6 | TST (temperature shock test cycling between −29° C. to 71° C. over 3-4 days) | | |
| | /1 cycle | 0/30 | 0/30 |
| | /2 cycles | 3/30 | 8/30 |
| | /3 cycles | 5/30 | 9/30 |
| 7 | 60° C./90% RH for 2 weeks | 0/25 | 0/30 |

It is evident that the neoprene modified asphalt is as good as the unmodified asphalt under all conditions and under long term severe temperature abuse conditions provides better leakage results.

Neoprene modified asphalt of composition 40% toluene, 4% Neoprene and 56% Gulf 2 asphalt (viscosity 2600 cps.) however exhibits a phase separation on standing. When applied after standing leakage control is somewhat worse than that of Gulf 2 asphalt alone, thereby indicating the necessity for maintaining homogeneity of the material in solution such as by controlling the amount of elastomer addition.

EXAMPLE 3

Groups of cells constructed as in Example 1 but with styrene based rubberized asphalt from Tremco Corp. being utilized as the cell sealant are abused under severe temperature and humidity conditions. Groups of cells with Gulf 2 asphalt sealant as in Example 2 are similarly abused as a control with the results given in Table II.

TABLE II

| CELL GROUP | ABUSE CONDITION | TREMCO MODIFIED ASPHALT | ASPHALT (control) |
|---|---|---|---|
| | | (leaking cells/total cells) | |
| 1 | 71° C. for 1 Week | 0/25 | 0/25 |
| | 71° C. for 2 weeks | 1/25 | 15/25 |
| | 71° C. for 3 weeks | 2/25 | 22/25 |
| | 71° C. for 4 weeks | 3/25 | 25/25 |
| 2 | TCHT/1 CYCLE | 1/25 | 0/25 |
| | TCHT/2 CYCLES | 2/25 | 1/25 |
| | TCHT/3 CYCLES | 4/25 | 13/25 |
| | TCHT/4 CYCLES | 9/25 | 22/25 |
| | TCHT/5 CYCLES | 11/25 | 25/25 |

In addition to the significant improvement in leakage control that the Tremco Corp. rubberized asphalt provides over the asphalt control, the Tremco Corp. material is not subject to detrimental liquid separation and gelling making it more suitable for manufacturing processes.

It is understood that the above examples are for illustrative purposes only and that changes may be made in materials, their proportions and the cell components and the construction thereof as well as other changes without departing from the scope of the present invention as defined in the following claims.

What is claimed is:

1. An electrochemical cell comprising an anode, a cathode and an electrolyte disposed within an open ended cylindrical metallic cell container, with an insulative cell top member being positioned within said open end of a sealant at the interface between said cell top member and said metallic cell container characterized in that said sealant is a mixture of a Type 2 BUR asphalt and an elastomeric material selected from the group consisting of (cis-1,4-polyisoprene), styrene-butadiene copolymer (SBR), cis-1,4-polybutadiene and styrene butadiene styrene (SBS), styrene isoprene styrene (SIS), neoprene (polychloroprene), acrylonitrile-butadiene copolymer (NBR), ethylene-propylene elastomers (EPR), butyl rubber (copolymers of isobutylene), urethane, nitrile (polymers of butadiene and acrylonitrile), polysulfide, polyacrylate, silicone, chlorosulfonated polyethylene, and EPDM (terpolymers of ethylene, propylene and diene monomers), and mixtures thereof, and wherein said elastomeric material is substantially inert to said electrolyte and is present in an amount between 0.5% to 10% by weight of said asphalt.

2. The electrochemical cell of claim 1 wherein the end of said cell container at said interface is crimped onto said cell top member to effect a seal for said cell.

3. The electrochemical cell of claim 1 wherein said electrolyte is comprised of aqueous KOH.

4. The electrochemical cell of claim 1 wherein said elastomeric material contains styrene.

5. The cell of claim 1 wherein said elastomeric material contains a stabilizing additive.

6. The electrochemical cell of claim 1 wherein said elastomeric material comprises between 1 to 2% by weight of said asphalt.

7. The electrochemical cell of claim 1, wherein said elastomeric material is comprised of chloroprene.

* * * * *